March 16, 1971   A. L. FREEDLANDER ETAL   3,570,229
MOWER BLADE
Filed Oct. 28, 1968
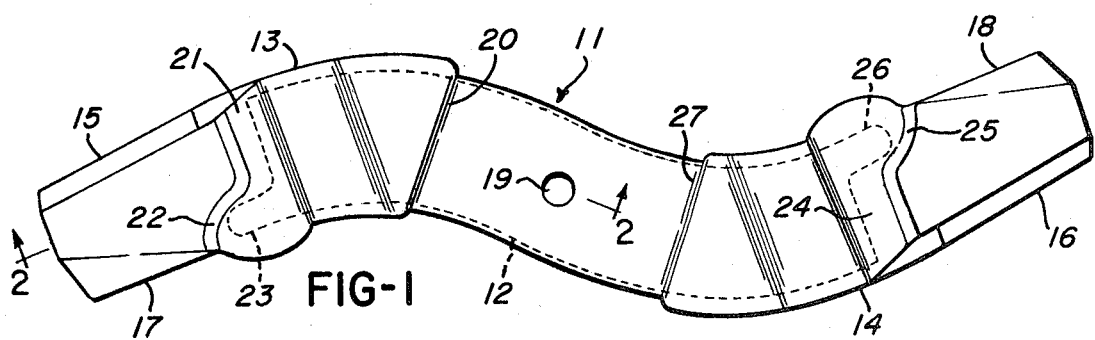
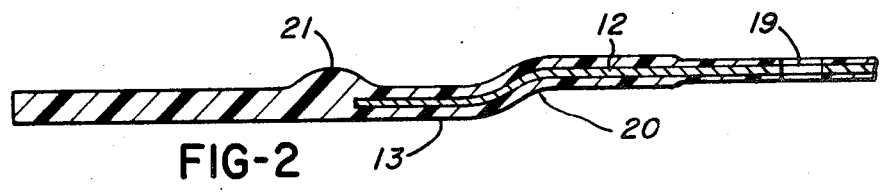
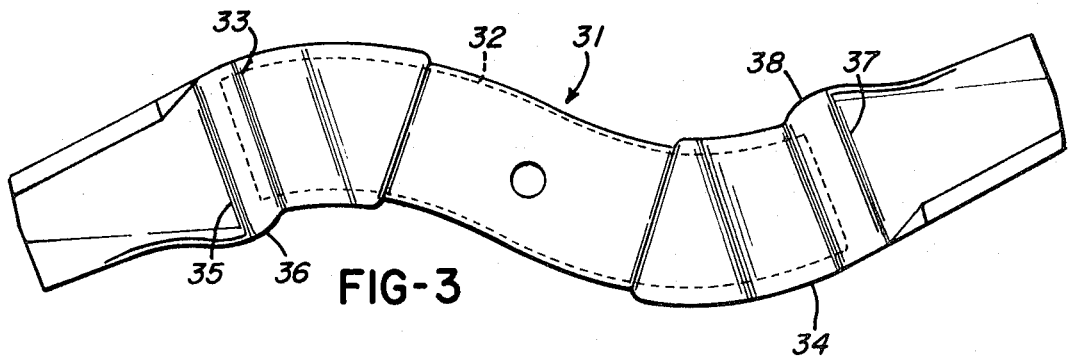
INVENTORS
ABRAHAM L. FREEDLANDER
ROBERT E. MATTHEWS
WAYNE C. GARRETT
BY
Reuben Wolk
ATTORNEY

United States Patent Office 3,570,229
Patented Mar. 16, 1971

3,570,229
MOWER BLADE
Abraham L. Freedlander, Dayton, Ohio, and Robert E. Matthews and Wayne C. Garrett, Waynesville, N.C., assignors to Dayco Corporation, Dayton, Ohio
Filed Oct. 28, 1968, Ser. No. 771,207
The portion of the term of the patent subsequent to Dec. 23, 1986, has been disclaimed
Int. Cl. A01d 55/18
U.S. Cl. 56—295             5 Claims

ABSTRACT OF THE DISCLOSURE

A flexible elastomeric lawn mower blade having outwardly extending arms and integral cutting edges, with a rigid central mounting plate embedded in the arms. The arms and the ends of the plate are offset from and curved with respect to the center portion of the plate, and the ends of the plate have an outwardly extending segment at the trailing edge.

---

The present application refers to a lawn mower blade of the type generally referred to in our previous application Ser. No. 740,389. In our prior application we have described a novel blade used on rotary lawn mowers representing an improvement over conventional metal blades. This novel blade is manufactured primarily of urethane elastomer but has a central mounting plate which provides overall rigidity. Blades of this general type have outwardly extending arms with integral elastomeric cutting and trailing edges which permit the blade to flex and ride over a foot or other member which may accidentally be placed under the blade, thus avoiding serious injury thereto. The central rigid mounting plate extends into the arms and terminates inwardly of the cutting edges, and at the same time the central portion of the blade is offset from the plane of the cutting edges and the arms are oppositely curved in a plane at right angles to the shaft.

This configuration is also similar to that described in our earlier Pat. No. 3,343,355. Blades of this general configuration have found wide use because the curved cutting arms permit the cutting surface to strike the blades of grass at an angle and provide a slicing action. By combining this configuration with the offset arrangement a superior blade is available. The concept of offsetting the center portion of the mounting plate from the cutting portion of the blade tends to reduce the drag on the combination by placing the non-cutting portions of the blade above the cutting plane.

In the development of blades of this type it was found that there was a tendency for the blade to straighten out the curved portions of the centrifugal forces involved. The purpose of the present invention is to form the mounting plate in such a manner that this tendency is overcome. This is accomplished by extending the outer ends of the plate along the trailing edges in the form of a lip or additional segment.

This invention will be more fully understood by referring to the following description and drawings, in which:

FIG. 1 is a perspective view of a novel blade in accordance with the invention.

FIG. 2 is a cross section of the blade taken along line 2—2 of FIG. 1.

FIG. 3 is an elevational view of a modified form of the blade.

Referring now to the drawings, FIG. 1 illustrates a novel blade 11 having a central mounting plate 12 which is generally flat along its center portion but is offset downwardly and extends into the outwardly extending arms 13 and 14 having cutting edges 15 and 16 at their extremities. Opposite the cutting edges are trailing edges 17 and 18. The arms are likewise offset as indicated by reference numerals 20 and 27. The arms 13 and 14 are made of an elastomer and preferably a urethane elastomer such as more fully described in the above-referenced patent. The plate 12 provides rigidity and is made of metal or a rigid plastic material such as nylon, polycarbonate, polystyrene, polyacetal, or the like, and has a mounting hole 19 extending through the center for the purpose of mounting the blade on the shaft of the mower.

As shown in the drawings, the outermost portions of the plate extend into the arms 13 and 14 and terminate just short of the cutting edges. These portions of the plate are curved in the same manner as the arms, which are oppositely curved in a plane at right angles to the shaft. The plate has an extra lip or segment on each end, designated as 23 and 26, along the trailing edges of the blade. This lip, by extending further outward than the remainder of the plate, reinforces the trailing edge of the blade at each end to overcome the above-mentioned tendency of the trailing edge to elongate and flatten out th curved shape.

In order to reinforce the ends of the plate and minimize tear-out of the plate, humps 21 and 24 are formed in the blade over the ends of the plate. These humps extend laterally of the blade, and are widened at sections 22 and 25 in order to provide this extra reinforcing over the lips 23 and 26. As shown in the drawing, these sections 22 and 25 extend above the upper surface with the rest of the humps, and also extend laterally outward from the trailing edges in the shape of ears.

FIG. 3 illustrates a modified form of the invention in which a blade 31 has a central mounting plate 32 and arms 33 and 34. In this configuration, the humps 35 and 37 extend laterally of the blade and beyond the end of the blade to form the ears 36 and 38. The end of the plate in this configuration, however, does not have the lips as in the principal form of the invention.

We claim:

1. In a lawn mower having a rotatable shaft and a cutting blade mounted thereon, said blade having outwardly extending arms with integral cutting and trailing edges of a flexible elastomer, and a rigid central mounting plate embedded in and extending outwardly into said arms and terminating inwardly of said cutting edges, the central portion of said blade being offset from the plane of said cutting edges, said arms and the outermost portions of said plate oppositely curved in a plane at right angles to the shaft, each end of said plate having an outwardly extending segment along said trailing edge.

2. The blade of claim 1 in which said trailing edges have ears extending outwardly therefrom adjacent said segment, said arms being thicker at the areas adjacent the ends of said plate and at said ears than in the remaining portions thereof.

3. The blade of claim 1 in which said elastomer is urethane.

4. The blade of claim 1 in which said plate is metal.

5. The blade of claim 1 in which said plate is a rigid plastic.

References Cited
UNITED STATES PATENTS

| | | | |
|---|---|---|---|
| 2,721,438 | 10/1955 | O'Maley | 56—295 |
| 3,184,907 | 5/1965 | Harloff | 56—295 |
| 3,302,377 | 2/1967 | Ely | 56—295 |
| 3,320,732 | 5/1967 | Kirk | 56—295 |
| 3,321,894 | 5/1967 | Ingram | 56—295 |
| 3,340,682 | 9/1967 | Ely | 56—295 |
| 3,388,540 | 6/1968 | Michaud | 56—295 |
| 3,398,517 | 8/1968 | Freedlander et al. | 56—295 |
| 3,485,022 | 12/1969 | Freedlander et al. | 56—295 |

LOUIS G. MANCENE, Primary Examiner

J. N. ESKOVITZ, Assistant Examiner